3,129,692
WORM POT OR HABITAT
Voris R. Sanderson, 1006 Main St., Murray, Ky.
Filed Apr. 1, 1963, Ser. No. 269,353
3 Claims. (Cl. 119—15)

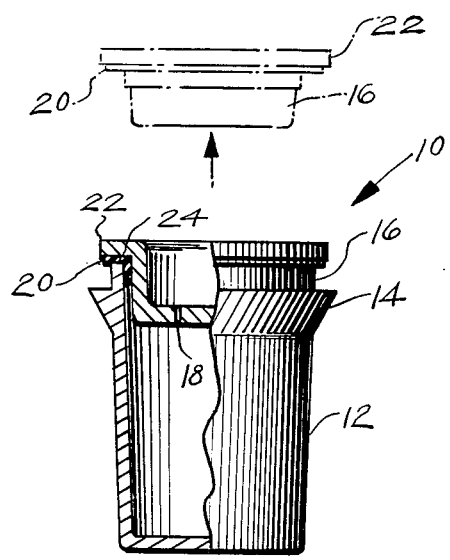
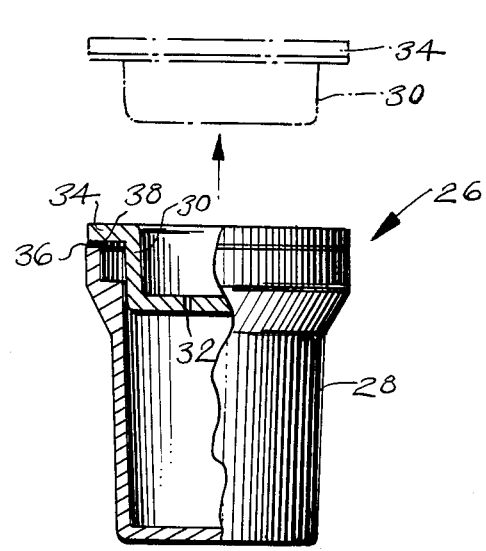
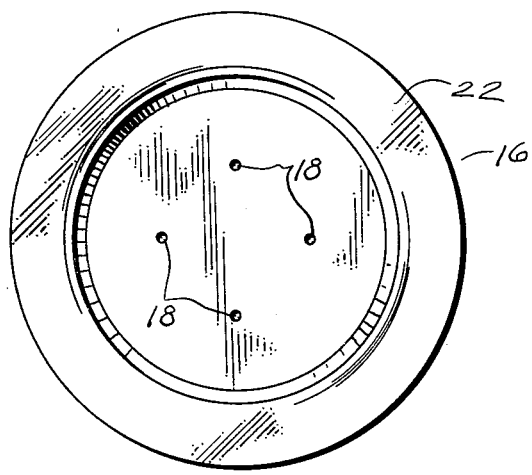
INVENTOR.
Voris R. Sanderson

This invention relates to porous containers for worms and the like.

It is an object of the present invention to provide a worm pot for storing, feeding and selling worms which are cultured earthworms used by homeowners, gardeners, farmers, fishermen and the like.

Another object of the present invention is to provide a worm pot which will allow long periods of storage for worms. They may be placed in pans or in open racks.

A further object of the invention is to provide a worm pot which will be able to retain water and may be emptied of its contents with a minimum amount of effort.

Other objects of the invention are to provide a worm pot bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a vertical view of a worm pot comprising the present invention;

FIG. 2 is an enlarged top plan view of the cover shown in FIG. 1;

FIG. 3 is a fragmentary side view of the rubber ring shown removed from FIG. 1;

FIG. 4 is a vertical view showing a modified form of the invention; and

FIG. 5 is a fragmentary side view of the rubber ring shown in FIG. 4.

A worm pot or habitat made in accordance with the present invention is shown to include a porous clay container 12 having an annular flange 14 near its upper extremity which provides a ledge means for emptying the contents from within by striking the ledge means against an object. A hollow cover 16 of cup-shape having tapered walls and a bottom is provided with a plurality of radially spaced apart openings 18 for introducing air from the outer atmosphere and water. The flanged rubber washer 20 is freely received by cover 16 and abuts with the underside of flange 22 of cover 16 and edge 24 of container 12, thus providing a means for preventing the escape of the worms contained within container 12 in the event that cover 16 is loosely fit on container 12.

In use, worms are placed into container 12 in the well-known manner and cover 16 is placed in the upper end of container 12 whereupon washer 20 frictionally holds cover 16 in place and also prevents the escape of the worms from within container 12. The washer 20 of rubber provides also a greater tolerance in the manufacture of worm pots 10. Feed is placed into container 12 and a small amount of water is added into cover 16, or is sprayed on the outside which will enable the worms to be kept for weeks within worm pot 10. Thus, they will increase in size and quality.

It will be noted that the worms will be placed in a bedding material, such as peat moss or other suitable material.

It will further be noted that worm pot 10 is tapered throughout its entire length for greater ease in emptying the contents from within.

In FIG. 4 a modified form of worm pot 26 is shown to include a hollow container 28 tapered and flared at its upper extremity which receives a hollow cover 30 and a plurality of radially spaced apart openings 32 for the entrance of air and water. Cover 30 is provided with an annular flange 34 which rests upon a circular rubber washer 36 which abuts against the upper edge 38 of container 28.

In use, cover 30 is frictionally secured to container 28 by flat rubber washer 36 which provides sealing means and prevents escape of the worms contained within container 28. The storing, feeding, transporting, watering and other functions of worm pot 26 are accomplished in the aforementioned manner, as heretofore described for the main embodiment of the present invention.

While various changes may be made in the detail construction, it shall be understood that such changes shall be within the spirit and scope of the present invention as defined by the appended claims.

What I claim as new and desire to protect by Letters Patent of the United States is:

1. A worm habitat comprising, in combination, a container of porous clay material and having a bottom and tapered walls, said container having a top edge and a thickened portion forming an annular ledge having an upper horizontal surface spaced below said top edge and adapted to facilitate emptying the contents of the container, a cover member having a main cup-shaped body portion providing tapered walls and a bottom wall positioned in the container and flange means supported on the top edge of the container, and a washer interposed between the top edge and the flange means, said main body portion of the cover being provided with openings in the bottom wall to provide for aeration and admittance of moisture for worms in the container.

2. The combination according to claim 1 wherein the annular ledge is on an outer wall surface of the container.

3. The combination according to claim 1 wherein the annular ledge is on an inner wall surface of the container.

References Cited in the file of this patent

UNITED STATES PATENTS

| | | |
|---|---|---|
| 1,843,563 | Knoernschild | Feb. 2, 1932 |
| 1,986,742 | Mosher | Jan. 1, 1935 |
| 2,328,993 | Norling | Sept. 7, 1943 |